US012759594B2

(12) United States Patent
Sumcad et al.

(10) Patent No.: US 12,759,594 B2
(45) Date of Patent: Oct. 13, 2026

(54) IMMERSIVE VEHICLE DRIVING EXPERIENCE

(71) Applicant: GM GLOBAL TECHNOLOGY OPERATIONS LLC, Detroit, MI (US)

(72) Inventors: Anthony J. Sumcad, Rochester Hills, MI (US); Russell A. Patenaude, Macomb Township, MI (US); Eric T. Hosey, Rochester Hills, MI (US); Ryan M. Edwards, Shelby Township, MI (US); Matthew E. Gilbert-Eyres, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 648 days.

(21) Appl. No.: 18/310,833

(22) Filed: May 2, 2023

(65) Prior Publication Data

US 2024/0367689 A1 Nov. 7, 2024

(51) Int. Cl.
*B60W 60/00* (2020.01)
*B60W 50/14* (2020.01)

(52) U.S. Cl.
CPC ........ *B60W 60/0051* (2020.02); *B60W 50/14* (2013.01); *B60W 60/001* (2020.02); *B60W 2540/221* (2020.02); *B60W 2540/30* (2013.01); *B60W 2554/406* (2020.02); *B60W 2554/408* (2020.02)

(58) Field of Classification Search
CPC ............. B60W 60/0051; B60W 50/14; B60W 60/001; B60W 2540/221; B60W 2540/30; B60W 2554/406; B60W 2554/408; G09B 9/052; G09B 9/04
USPC ............................................................ 434/29
See application file for complete search history.

(56) References Cited

U.S. PATENT DOCUMENTS

| | | | | |
|---|---|---|---|---|
| 7,246,050 B2 * | 7/2007 | Sheridan | G09B 9/05 701/1 |
| 8,190,295 B1 * | 5/2012 | Garretson | G09B 9/04 700/245 |
| 2018/0204478 A1 * | 7/2018 | Banga | G09B 9/042 |
| 2018/0286269 A1 * | 10/2018 | Lechner | G09B 9/165 |
| 2019/0077417 A1 * | 3/2019 | Kleen | G06V 20/20 |
| 2023/0039658 A1 * | 2/2023 | Ariyaratne | B60W 30/0956 |
| 2024/0112077 A1 * | 4/2024 | Agrawal | G06N 20/00 |

* cited by examiner

*Primary Examiner* — Peter S Vasat
*Assistant Examiner* — Stephen Alvesteffer
(74) *Attorney, Agent, or Firm* — Quinn IP Law

(57) ABSTRACT

An immersive vehicle driving experience for a driver or occupant of a vehicle. The vehicle driving experience may include controlling a vehicle operating system to provide a challenge created for exposing vehicle occupants to one or more challenging driving conditions. The challenge may include a roadway event, a deteriorated performance event, a complex driving situation, an augmented reality (AR) event, and the like.

20 Claims, 4 Drawing Sheets

IMMERSIVE VEHICLE DRIVING EXPERIENCE

INTRODUCTION

The present disclosure relates to providing an immersive vehicle driving experience, such as but not necessarily limited to an immersive vehicle driving experience whereby one or more vehicle operating systems may be selectively controlled to expose a driver or other vehicle occupant to one or more challenging driving conditions.

A vehicle may experience challenging driving conditions for a number of reasons, such as in response to one or more vehicle systems onboard the vehicle operating outside of typical or desired operating ranges and/or in response to inclement weather, traffic congestion, construction, and/or other external influences affecting vehicle performance. It may be beneficial to provide a driver or other occupant assistance in learning how to understand and operate the vehicle before being faced with such challenging driving conditions and/or to educate a mechanic or other repair individual in understanding traits, symptoms, and other operational factors that a driver may have noticed before requesting repair work.

SUMMARYNON

One non-limiting aspect of the present disclosure relates to providing an immersive vehicle driving experience whereby a driver or other occupant of a vehicle may be exposed to various challenges. The challenges may be configured to immerse a vehicle occupant in challenging driving conditions for purposes of learning how to understand and operate the vehicle and/or to educate a mechanic or other repair individual in understanding traits, symptoms, and other operational factors that a driver may have noticed before requesting repair work. The immersive vehicle driving experience may be undertaken at a test track or other controlled environment before encountering challenging driving conditions in the real-world or an uncontrolled environment. The immersive vehicle driving experience may also occur within the real-world, such as by implementing the challenges while the vehicle is traveling upon a roadway occupied by other vehicles, objects, etc.

One non-limiting aspect of the present disclosure relates to a method for an immersive vehicle driving experience. The method may include determining one or more vehicle systems configured for controlling one or more functions of a vehicle and determining one or more real parameters for the vehicle systems. The real parameters may control the vehicle system associated therewith to provide a real driving experience. The method may further include determining a challenge to be implemented as at least part of the immersive vehicle driving experience. The challenge may expose a driver of the vehicle to circumstances selected to simulate challenging driving conditions. The method may further include generating one or more challenge parameters for the challenge. The challenge parameters may differ from the real parameters to relatedly alter operation of the vehicle system associated therewith to correspondingly implement the challenge.

The challenge may include a roadway event to y cause the driver to experience a challenge condition while traversing a roadway, optionally with the challenge condition differing from a real condition of the roadway the driver would otherwise experience during the real driving experience.

The challenge may include a deteriorated performance event to cause the driver to experience deteriorated performance for one or more vehicle systems, optionally with the deteriorated performance differing from a real performance the driver would otherwise experience for the vehicle systems during the real driving experience.

The challenge including a complex driving situation to direct the driver to navigate the vehicle to a complex traffic situation while undertaking the immersive vehicle driving experience.

The complex traffic situation may correspond with a construction area, a lane convergence area, a traffic shift area, and/or a traffic congested area.

The challenge may include challenge instructions for navigating the vehicle to the complex traffic situation. The challenge instructions may identify a time, a location, a set of positioning coordinates, and/or a route to be traversed for the complex traffic situation.

The challenge may include an augmented reality (AR) event resulting in one or more virtual objects being interfaced with the driver during the immersive vehicle driving experience, optionally such that the virtual objects appear within a real environment exterior to the vehicle.

The method may include monitoring operating states for one or more of the vehicle systems while the vehicle is operating according to the immersive vehicle driving experience and implementing an override in response to one or more of the operating states exceeding a threshold. The override may cause the vehicle to operate thereafter according to the real driving experience.

The method may include activating the immersive vehicle driving experience in response to an input of the driver made to a user interface of the vehicle and automatically implementing the override without requiring the driver to correspondingly engage the user interface.

The method may include monitoring a performance of the driver during the immersive driving experience and generating a performance report based on the performance, the performance report including driving and/or operating errors made by the driver during the immersive driving experience.

The method may include monitoring biometric data of the driver during the immersive driving experience and generating a biometrics report based on the biometric data, the biometrics report including a stress mapping of stress experienced by the driver during the immersive driving experience.

The challenge may include one or more of a flat tire, hard braking, heavy traffic, traffic shifts, event traffic, potholes, towing, a construction zone, hard rain, fog, ice, depleted battery, low wiper fluid waring, low fuel warning, service engine warning, overheat warning, camera or mirror inoperability, reduced engine or motor power, and/or hard acceleration.

One non-limiting aspect of the present disclosure relates to a system for providing an immersive vehicle driving experience. The system may include a vehicle operating system configured for controlling a plurality of vehicle systems operating onboard a vehicle. The vehicle systems may be configured for controlling related operations of the vehicle. The system may include an immersive module configured for controlling the vehicle operating system to implement the immersive vehicle driving experience. The immersive vehicle driving experience may provide a challenge to expose a driver of the vehicle to one or more challenging driving conditions.

The challenge may include a roadway event for causing the driver to experience a challenge condition while traversing a roadway. The challenge condition may differ from a real condition of the roadway the driver would otherwise experience during a real driving experience.

The challenge may include a deteriorated performance event for causing the driver to experience deteriorated performance for one or more vehicle systems. The deteriorated performance may differ from a real performance the driver would otherwise experience for the vehicle systems during the real driving experience.

The challenge may include a complex driving situation for directing the driver to navigate the vehicle to a complex traffic condition while undertaking the immersive vehicle driving experience.

The challenge may include an augmented reality (AR) event resulting in one or more virtual objects being interfaced with the driver during the immersive vehicle driving experience.

The immersive module is configured for monitoring biometrics of the driver while undertaking the challenge and providing a biometric report based on the biometrics, the biometric report including stress related responses of the driver during the challenge.

One non-limiting aspect of the present disclosure relates to an immersive module for providing an immersive vehicle driving experience. The module may be configured for controlling a vehicle operating system of a vehicle to provide the immersive vehicle driving experience. The immersive vehicle driving experience may provide a challenge to expose a driver of the vehicle to one or more challenging driving conditions, optionally with the challenge including each of a roadway event, a deteriorated performance event, a complex driving situation, and an augmented reality (AR) event. The module may be further configured for monitoring biometric data of the driver during the immersive driving experience, and based thereon, generating a biometrics report, the biometrics report including stress related responses of the driver during the challenge.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
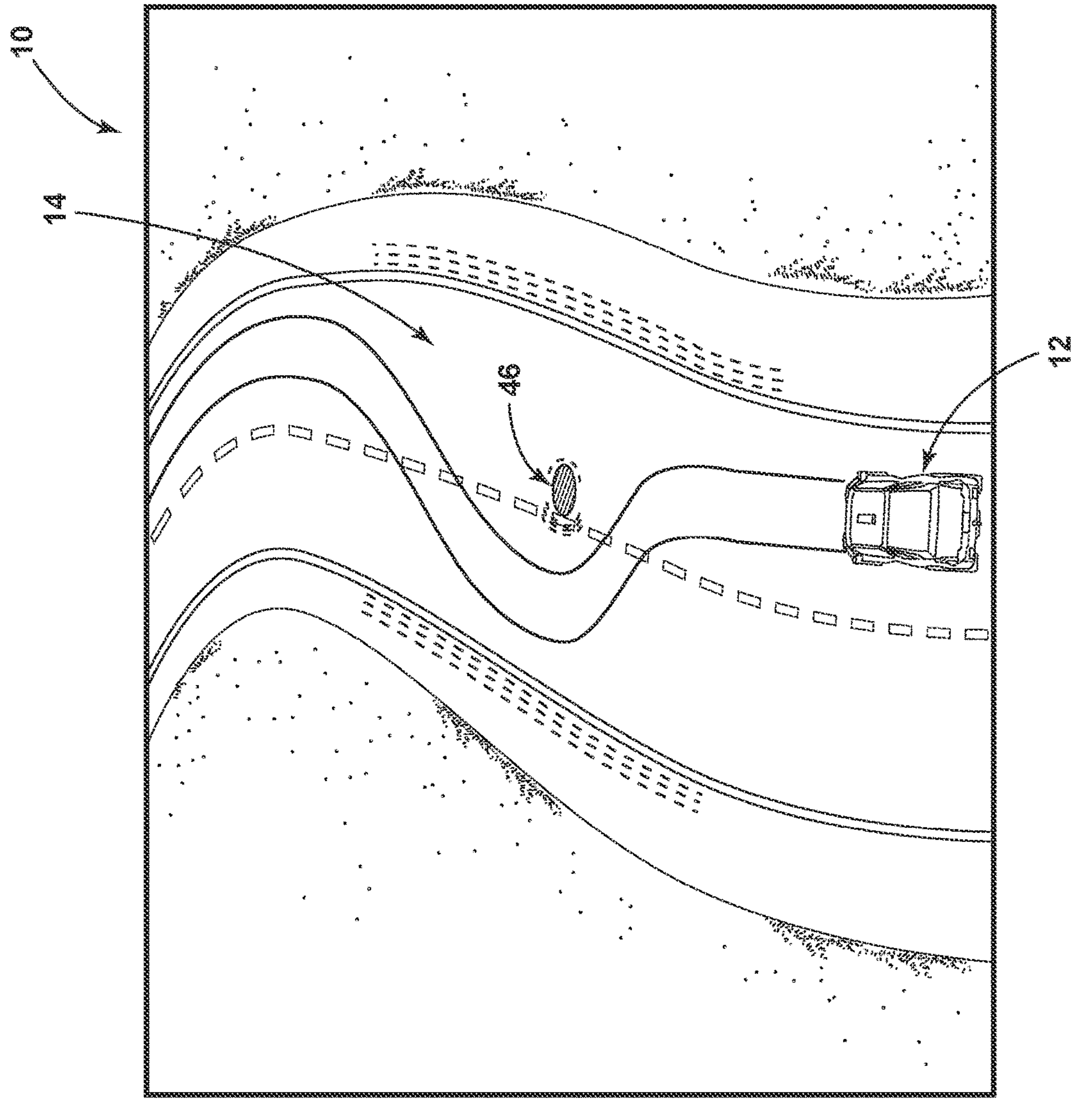
FIG. 1 illustrates a system for providing an immersive vehicle driving experience in accordance with one non-limiting aspect of the present disclosure.

FIG. 1 illustrates a system 10 for providing an immersive vehicle driving experience in accordance with one non-limiting aspect of the present disclosure. The system 10 may be configured for intentionally exposing a driver and/or other occupant of a vehicle 12 to a wide variety of challenging driving conditions. The exposure to challenging driving conditions may be beneficial in enabling individuals to learn how the vehicle 12 operates and how to operate the vehicle 12 when faced with various circumstances. One non-limiting aspect of the present disclosure contemplates the immersive vehicle driving experience being configured for exposing individuals to challenging driving conditions while operating the vehicle 12 at a test track or in another controlled environment and/or while operating the vehicle 12 in the real-world or in an uncontrolled environment. FIG. 1 illustrates the vehicle 12 traveling upon a roadway 14, which may correspond with driving the vehicle 12 in a controlled or uncontrolled environment and is shown for non-limiting purposes to correspond with a paved road 14 as the present disclosure fully contemplates the immersive experience also improving off-road related driving scenarios. The selection of an environment for the immersive vehicle driving experience may depend on the challenging driving conditions of interest, i.e., some conditions may be better suited to a test track whereas other conditions may be better suited to the real-world.

Figure 2:
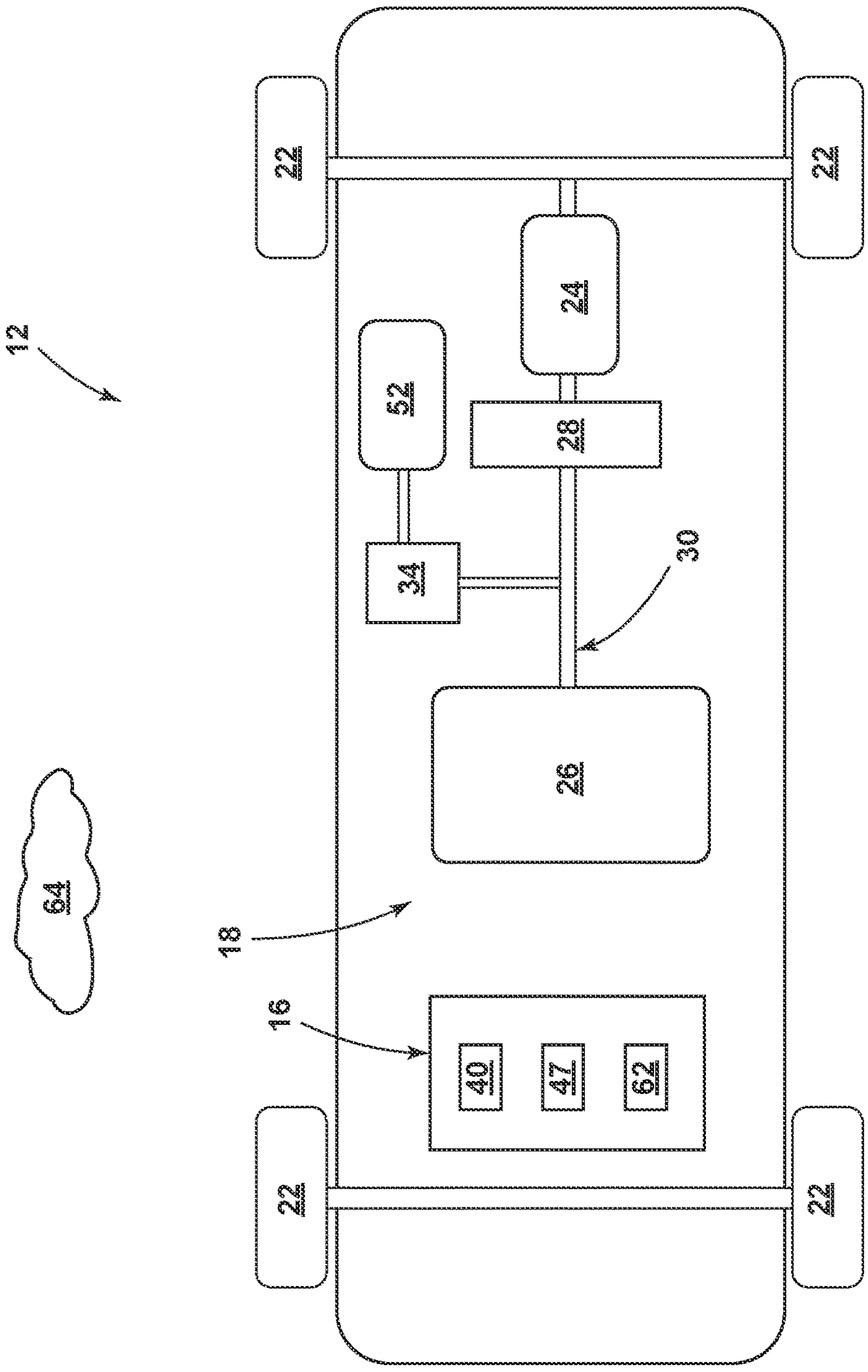
FIG. 2 illustrates a schematic view of the vehicle in accordance with one non-limiting aspect of the present disclosure.

FIG. 2 illustrates a schematic view of the vehicle 12 in accordance with one non-limiting aspect of the present disclosure. The vehicle 12 may include a vehicle operating system 16 configured for controlling a plurality of vehicle systems 18. The vehicle systems 18 may be comprised of a plurality of control modules, electronic control units (ECUs), circuits, processors, etc. configured to support, control, or otherwise enable one or more functions, operations, capabilities, etc. for the vehicle 12. The vehicle 12 is illustrated for non-limiting purposes as including a plurality of wheels 22 capable of being driven with an electric motor 24, such as with electrical power provided from a battery pack 26 and converted with an AC-DC converter 28. An electrical power distribution system 30 may be included for distributing electrical power between the battery pack 26 and additional loads 32 onboard the vehicle 12 via a DC-to-DC converter 34. The vehicle 12 may be considered as an electric vehicle, however, the present disclosure fully contemplates the vehicle 12 being operable with internal combustion engine (ICE) and/or configured as another type of device having other componentry. The vehicle operating system 16 may be configured to control additional systems, subsystems, and other functions of the vehicle 12, and as such, the illustrated systems 18 are presented merely for exemplary and non-limiting purposes.

As one skilled in the art may appreciate, the vehicle operating system 16 may be configured for managing, controlling, directing, etc. a vast quantity of vehicle systems, modules, circuits, etc. While not exclusive and for non-limited purposes, the vehicle operating system 16 may include functions controlled or associated with one or more of the following modules or systems: Anti-lock Braking System (ABS); AC (Air Conditioning); Accelerator Pedal Position (APP) Control; Adaptive Cruise Control (ACC) Control; Air Suspension Control; Airbag Control; Anti-lock Braking System (ABS) Control; Audio Amplifier; Audio Equalization; Audio Filter; Audio Mixer; Audio/Infotainment system 47 Control; Automatic Headlamp Control; Automatic Transmission Control; Automatic Wiper Control; Auxiliary Power Outlet Control; Backup Camera Control; Battery Management System (BMS); Blind Spot Monitoring Control; Body Control (BCM); Brake Assist; Camshaft Control; Charging Control; Charging Control; Climate Control; Collision Avoidance; Collision Warning; Comfort Access Control; Compass Control; Cruise Control; Cylinder Deactivation Control; Daytime Running Light Control; Diesel Exhaust Fluid (DEF) Control; Differential Control; Digital Sound Processor (DSP); Direct Injection Control; Door Control; Drive Mode Selector; Driver Attention Warning; Electric Parking Brake (EPB); Electronic Power Steering (EPS) Control; Electronic Stability Control (ESC) Control; Electronic Throttle Control (ETC); Engine Control (ECM); Powertrain Control (PCM); Engine Cooling Fan Control; Engine Heater Control; Engine Oil Cooler Control; Engine Oil Pressure Control; Engine Start Control; Engine Stop Control; Entertainment System Control; Exhaust Gas Recirculation (EGR) Control; Exhaust System Control; Exterior Lighting Control; Fuel Delivery Control; Fuel Injection Control; Fuel Pump Control; Fuel Tank Pressure Control; Gateway; Headlight Control; Head-Up Display Control; Heater Control; High Beam Control; Hill Descent Control; Hill Start Assist Control; HVAC (Heating, Ventilation, and Air Conditioning) Control; Hybrid Control; Idle Air Control; Ignition Control; In-car Temperature Sensor Control; Infotainment Control; Instrument Cluster; Instrument Cluster; Intake Air Control; Intelligent Cruise Control; Interior Lighting Control; Key Fob Control; Keyless Entry; Lane Departure Warning (LDW) Control; Lane Keeping Assist; Lighting Control; Lighting Control Mod; Lock Control; Low Tire Pressure Warning; Lumbar Support Control; Mass Airflow Sensor (MAF); Mirror Control; Motor Control Unit (MCU); Multi-Information Display Control; Multi-Zone Climate Control; Navigation Control; Navigation Control; Occupant Classification System; Oil Cooler Fan Control; Oil Pressure Control; On-board Charger Control; Parking Assist Control; Parking Brake Control; Passive Entry; Power Steering Control; Powertrain Control (PCM); Radiator Fan Control; Rear Camera Control; Rear Differential Control; Rear Seat Entertainment; Remote Start Control; Restraint Control; Satellite Radio Control; Seat Control; Security Control; Shift Control; Side View Camera Control; Smart Key Control; Start-Stop Control; Steering Control; Steering Control; Suspension Control; Suspension Control; Transmission Control; Throttle Control; Tire Pressure Monitoring System (TPMS); Traction Control; Trailer Tow Control; Transmission Control (TCM); Transmission Range Control; Transmission Shift Control; Turbocharger Control; Vehicle Control Unit (VCU); Vehicle Dynamics Control; Vehicle Stability Control; Video Display Control; Voice Recognition Control; Voltage Regulator Control; Washer Fluid Control; Wiper Control; and/or Wireless Charging Control.

One non-limiting aspect of the present disclosure contemplates the vehicle 12 including an immersive module 40 configured for controlling the vehicle operating system 16 to implement the immersive vehicle driving experience. The immersive module 40 may be configured for enabling the immersive vehicle driving experience by providing one or more challenges to the driver, or other occupant of the vehicle 12, optionally while the vehicle 12 is stationary, such as through augmented reality (AR) and/or virtual reality (VR) and/or while the vehicle 12 is in motion or being actively driven, which may also include AR and/or VR activities. The immersive module 40 may be configured to facilitate implementing the immersive vehicle driving experience through corresponding control of the vehicle operating system 16 and/or the vehicle systems 18 controlled thereby, such as by generating instructions for controlling the vehicle operating system 16 to deliver the challenging driving conditions even if the vehicle 12 is not actually experiencing the driving conditions in the real-world. The immersive module 40, in other words, may be configured to control differing combinations of the vehicle systems 18 so that the vehicle 12 appears, at least to the driver or other occupant, to be experiencing challenging driving conditions even if the challenging driving conditions are not actually occurring in the real-world and/or to supplement actual conditions occurring within the real-world with fabricated or simulated challenging driving conditions implemented via corresponding control of the vehicle operating system 16.

The immersive module 40, for example, may be configured to implement various challenges by correspondingly adapting operating parameters for one or more of the vehicle systems 18. The immersive module 40 may be configured to design the challenges according to capabilities of the operating system 16 to selectively control operating parameters of the modules, controllers, etc. comprising the vehicle systems 18. The immersive module 40 may be operable for generating challenge parameters for each of the desired challenges. The challenge parameters may differ from real parameters typically utilized for the corresponding vehicle systems 18 when providing a real driving experience. The real driving experience may correspond with normal or typical configurations of the vehicle systems 18 to support normal or regular driving of the vehicle 12. This real driving experience may utilize the real parameters to specify decisions, functions, operations, ranges, limits, and/or other parameters for operating the corresponding vehicle systems. The real parameters, accordingly, may be considered as those typically employed to provide desirable or non-challenging operating conditions for the vehicle 12. The immersive module 40 may be configured for providing the immersive vehicle driving experience by altering the real parameters to the challenge parameters, i.e., changing real operating parameters to challenging operating parameters or abnormal operating parameters, for purposes of providing a challenge to the vehicle 12 occupant.

The present disclosure contemplates the immersive module 40 having capabilities sufficient to generate a wide variety of challenges. The challenges may be generated according to a predefined set of characteristics or challenging operating conditions intended for presentation to the driver or other vehicle occupant. The challenges may correspond with different levels such that differing combinations of the vehicle systems 18 and their attendant operating parameters may be altered from the real parameters to the challenge parameters as needed, at least temporarily, to implement a corresponding one or more of the challenges. One non-limiting aspect of the present disclosure contemplates combining multi-phase immersive experiences from virtual, to blended, to 100% real, or real world experiences. The immersive experience may include leveraging simulations such as augmented reality with a stationary or moving vehicle 12 (e.g. Level 1); actuating events from various vehicle systems or subsystems 18 like low fuel indication, propulsion systems, steering systems, braking systems, low washer fluid, and slippery driving indications (e.g., Level 2); identifying time, event, and/or location based complex driving situations, like sporting or concert events, rush hour, lane convergences, traffic tunnels, and traffic shifts (e.g., Level 3); and/or compilating multi-complex event driving events like a concert event, rush hour event and a traffic shift (e.g., Level 4). The immersive module 40 may be configured for marrying varying levels of simulated and real events to allow vehicle occupants to progressively exercise without having to actually attempt challenging and complex driving situations within the real world.

Figure 3:
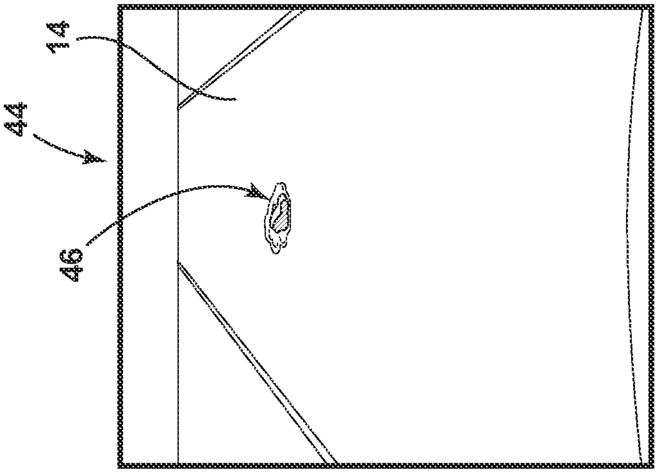
FIG. 3 illustrates a stationary vehicle challenge in accordance with one non-limiting aspect of the present disclosure.

FIG. 3 illustrates a stationary vehicle challenge 44 in accordance with one non-limiting aspect of the present disclosure. The stationary vehicle challenge 44 may be one type of the challenges whereby the driver may be exposed to challenging driving conditions without having to actually drive the vehicle 12 in the real world. The stationary vehicle challenge 44 may be provided by the immersive module 40 correspondingly controlling the operating system 16 to display a virtual pothole or other virtual object 46 within the roadway 14. The virtual pothole 46 is shown for non-limited purposes as other virtual objects (e.g., construction cones, additional vehicles, etc.) and/or multiple virtual objects may be provided as AR events. The virtual objects 46 may be displayed through a heads up display (HUD), AR and/or VR device, or other equipment onboard the vehicle 12, or optionally through additional componentry within the vehicle 12, e.g., a mobile phone, computer, etc. carried by one of the passengers. The virtual object 46 may be presented to appear within an exterior environment of the vehicle 12, such as the illustrated roadway 14. The immersive module 40 may correspondingly provide instructions, such as via an infotainment system 47 onboard the vehicle 12, to the driver for instructing the driver to commence driving. The driver may correspondingly operate a steering wheel, a brake pedal, an accelerator, and/or otherwise interact with the vehicle 12 as if the driver were driving the vehicle 12 in the real world. Rather than resulting in real control of the vehicle 12, the vehicle operating system 16 may be configured to instead simulate the corresponding control, i.e., generate corresponding virtual objects to make it appear to the driver that the vehicle 12 is moving as controlled even though the vehicle 12 is stationary. The driver may thereafter virtually navigate around the virtual pothole 46, optionally with the immersive module 40 being configured to contemporaneously monitor driver performance, errors, stress, biometrics, etc. and generate corresponding report.

Figure 4:
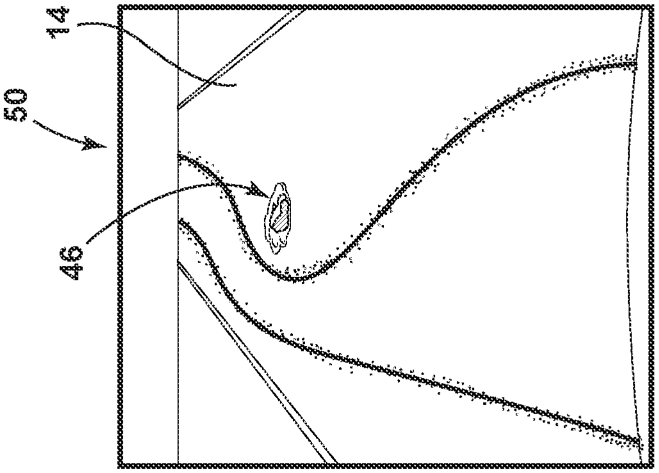
FIG. 4 illustrates a non-complex moving vehicle challenge in accordance with one non-limiting aspect of the present disclosure.

FIG. 4 illustrates a non-complex moving vehicle challenge 50 in accordance with one non-limiting aspect of the present disclosure. The non-complex moving vehicle challenge 50 may be one type of the challenges whereby the driver may be exposed to challenging driving conditions while actually driving the vehicle 12 in the real world but with a virtual pothole or other virtual object 46 within the roadway instead of a real pothole or other real object being present in the real world. The non-complex moving vehicle challenge may be performed similarly to the stationary vehicle challenge except for the commands issued by the driver other occupant of the vehicle 12 being implemented in the real world as if the corresponding controls were implemented as part of a real driving experience. The non-complex moving vehicle challenge, accordingly, may correspond with an AR event or other simulated event 46 being added to what would otherwise be a real driving experience. The capability to expose the driver to a virtual pothole 46 without requiring the driver to operate the vehicle 12 relative to an actual pothole, may be beneficial in enabling the driver to experience the corresponding challenging driving condition without real world exposure. The immersive module 40 may correspondingly monitor driver performance, errors, stress, biometrics, etc. and generate corresponding report.

Figure 5:
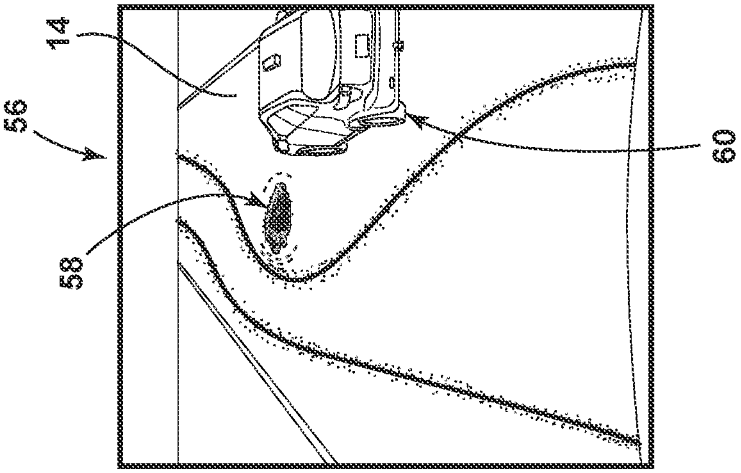
FIG. 5 illustrates a complex moving vehicle challenge in accordance with one non-limiting aspect of the present disclosure.

FIG. 5 illustrates a complex moving vehicle challenge 56 in accordance with one non-limiting aspect of the present disclosure. The complex moving vehicle challenge may be one type of the challenges whereby the driver may be exposed to challenging driving conditions while actually driving the vehicle 12 in the real world and with a real pothole or other real object 58 being present in the real world. The complex moving vehicle challenge may include the immersive module 40 providing the driver challenge instructions for navigating vehicle to a complex traffic situation, such as the illustrated pothole 58, and/or to another type of complex traffic situation to be experienced while undertaking the immersive driving vehicle driving experience. Additional complex traffic scenarios may correspond with a construction area, a lane convergence area, a traffic shift area, and/or a traffic congested area. The challenge instructions may include identifying a time, location, a set of position coordinates, and/or a route to be traversed for the complex traffic situation. The complex moving vehicle challenge 56 may additionally include AR events, such as a disabled AR vehicle 60, and/or supplemental event, such as a low fuel or low tire indicator being displayed even though the vehicle 12 is not actually experiencing the corresponding condition in the real world. The capability of directing the driver to a real world set of circumstances, while optionally providing AR and/or simulated event 60, may be beneficial in directing the driver to the challenging conditions with aforethought, i.e., so that the driver has some anticipation of the impending circumstance beforehand. The immersive module 40 may correspondingly monitor driver performance, errors, stress, biometrics, etc. and generate corresponding report.

The foregoing are merely illustrative of the vast capabilities available in accordance with the present disclosure to facilitate providing an immersive vehicle driving experience. The foregoing is predominantly described with respect to the immersive module 40 generating challenge parameters, instructions, etc. to facilitate altering or otherwise controlling the vehicle operating system 16 to provide various challenges, i.e., to operate the vehicle 12 such that the driver may be intentionally exposed with aforethought to complex situations and/or such that events may be simulated in a manner that causes the driver of the occupant of the vehicle 12 to understand conditions differing from those that would otherwise be understood during a real driving experience. The immersion module may correspondingly provide the immersive driving experience while virtual or simulated events are presented while the vehicle 12 is stationary (e.g. FIG. 3), while virtual or simulated events are presented while the vehicle 12 is moving in a controlled environment (e.g., FIG. 4), and/or while virtual or simulated events are presented with real world events while the vehicle 12 is moving in an uncontrolled environment (e.g., FIG. 5). The immersive vehicle driving experience, however, is not intended to be limited to these exemplary challenges as the present disclosure fully contemplates presenting the immersive vehicle driving experience by implementing related control of any one or more of modules, systems, etc. onboard the vehicle 12.

The immersive module 40 may optionally be controlled according to instructions provided from a mobile device 62, a back office controller 64, etc., optionally with an instructor or other individual being present within the vehicle 12 to control the immersive vehicle driving experience. A mobile application may operate on the mobile device 62 such that driving instructors may be enabled to create a sequence of challenges for a student driver before commencing a driving test, to generate challenges in real-time while a student driver is operating the vehicle 12, e.g., to provide virtual objects in simulation of real objects or to direct the driver to a complex traffic situation, and/or to override over otherwise superseding the immersive module 40, such as by terminating simulations, virtual objects, etc. in response to the student driver experiencing undesirable levels of stress. The mobile device 62 may also be beneficial with mechanics and technicians insofar as it may be used in cooperation with the immersive module 40 to facilitate generating the challenges to represent conditions, traits, influences, etc. communicated by a driver bringing a vehicle in for repair and/or as an educational tool, i.e., the challenges may be simulated to present tests or challenges for mechanics as part of a learning experience used to diagnose mechanical or other operational issues for a vehicle without the vehicle 12 having to actually experience the symptoms in the real world.

Figure 6:
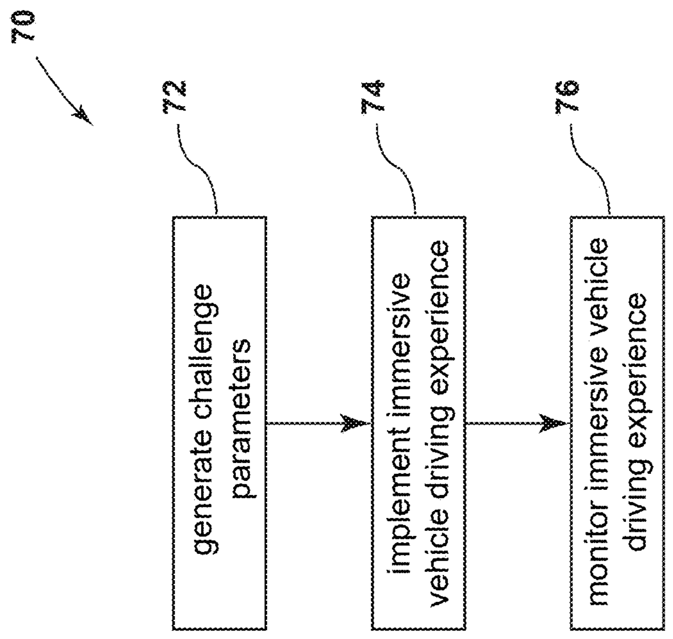
FIG. 6 illustrates a flowchart of a method for providing an immersive vehicle driving experience in accordance with one non-limiting aspect of the present disclosure.

FIG. 6 illustrates a flowchart 68 of a method for providing an immersive vehicle driving experience in accordance with one non-limiting aspect of the present disclosure. The method may be facilitated with the immersive module 40 issuing corresponding commands, instructions, etc. to the vehicle operating system 16 and/or the vehicle operating system 16 otherwise being controlled to facilitate the operations and other processes contemplated herein. Some or all of the activities relied upon to control the vehicle 12 and otherwise support the immersive vehicle driving experience may be directed through software or other logical constructs, such as according to processor execution of non-transitory instructions stored on an associated computer-readable storage medium, optionally with portions of the non-transitory instructions being stored across multiple computer-readable storage mediums and/or executed with multiple processors, microcontrollers, etc. The method is predominantly described with respect to the above-describe vehicle, e.g., an automobile configured for traveling upon a roadway, however, the present disclosure fully contemplates its use and application in providing immersive experiences for operators of other types of vehicles and/or devices.

Block 70 relates to a challenge process for generating a challenge to be implemented as part of an immersive vehicle driving experience to expose vehicle occupants to challenging driving conditions. The challenge process may include delineating one or more simulations, virtual objects, events, etc. to be presented to the driver and/or other vehicle occupant during the immersive driving experience, such as to emulate a flat tire, hard braking. heavy traffic, traffic shifts, event traffic, potholes, towing, a construction zone, hard rain, fog, ice, depleted battery, low wiper fluid waring, low fuel warning, service engine warning, overheat warning, camera or mirror inoperability, reduced engine or motor power, and/or hard acceleration challenge. The challenge may include a roadway event configured for causing the driver to experience a challenge condition while traversing a roadway that may differ from a real condition of the roadway the driver would otherwise experience during the real driving experience. The challenge may include a deteriorated performance event configured for causing the driver to experience deteriorated performance for one or more vehicle systems that may differ from a real performance the driver would otherwise experience for the vehicle systems 18 during the real driving experience. The challenge may include a complex driving situation configured for directing the driver to navigate the vehicle 12 to a complex traffic situation while undertaking the immersive vehicle driving experience. The challenge may include an augmented reality (AR) event or simulated event configured for providing one or more virtual objects or otherwise controlling features of the vehicle 12 to interface unreal conditions with the driver. The challenge or multiple challenges included as part of the immersive vehicle driving experience may optionally be selected through a menu or other interface, which may be actuated by the driver and/or vehicle occupant, such as through the infotainment system 47 or the mobile device 62.

Block 72 relates to a parameters process for generating challenge parameters to implement the challenge. The parameters process may relate to the immersive module 40 determining alterations, variations, disablements, or other control methodologies needed to for directing the vehicle operating system 16 to implement the challenge. This may include determining real parameters utilized by the control modules, ECUs, processors, etc. employed by the vehicle systems 18 to provide a real driving experience. The real driving experience may correspond with a typical or desired operating configuration utilized by the vehicle operating system 16 to control operation of the vehicle 12 when the vehicle 12 is normally operating. The parameters process may include determining alterations to be made to the real parameters for the immersive vehicle driving experience. This may include generating challenge parameters to replace or supplement the real parameters for the relevant control modules, ECUs, etc. comprising the corresponding vehicle systems. The challenge parameters may be generated such that driver inputs, passenger inputs, communications with the vehicle 12, and other operations of the vehicle 12 may be temporarily altered while the immersive vehicle driving experience is being provided.

Block 74 relates to an immersive process for implementing the immersive vehicle driving experience. The immersive process may include the immersive module 40 directing the vehicle operating system 16 to implement the real parameters, such as by correspondingly replacing, re-flashing or otherwise overwriting the attendant vehicle systems, control modules, etc. The simulation process may including generating override parameters or other information to be used during the immersive vehicle driving experiences to determine whether vehicle is encountering situations whereby it may be desirable to supersede the challenge parameters in favor of returning to operating the vehicle 12 according to the real parameters, i.e., resetting the vehicle 12 to operate according to the real driving experience. The simulation process, accordingly, may relate to defining a set of characteristics, values, metrics, etc. as part of the corresponding of the challenge parameters to be used during the immersive vehicle driving experience and to contrast the settings associated therewith relative to the real driving experience. The capability to differentiate the challenge parameters from the real parameters may be beneficial in implementing the challenges at a granular level while maintaining the capability to override the challenges or revert to real driving conditions when needed.

Block 76 relates to a monitoring process for monitoring the immersive vehicle driving experience. The monitoring process may include monitoring biometrics of the driver and/or vehicle occupants. The biometrics may be monitored to track reactions, stresses, and other biometric influences experienced by the vehicle 12 occupants during the immersive driving experience. The corresponding biometrics may be tabulated in a report generated at a conclusion of the immersive vehicle driving experience to represent stresses experienced by the vehicle 12 occupants during the challenges. The monitoring process may also include monitoring performance of the driver during the immersive driving experience, e.g., determining whether the driver has made any mistakes or errors when operating the vehicle 12. The mistakes or errors may be determined relative to a checklist rather predefined set of variables selected to measure performance. The monitoring process may similarly include monitoring environmental influences, driving situations, and other circumstances to log activities surrounding the immersive vehicle driving experience. The data or other information collected as part of the monitoring process may be tabulated and reported for use in modifying vehicle course training, highlighting areas of stress, providing feedback for areas of improvement, etc.

As supported above, the immersive module may be configured to create an immersive vehicle driving experience that blends virtual and real-world driving experiences that are complex and user customized. This may consist of varying levels of virtual or simulated complex driving situation as well as actual complex driving situation enablements. The challenging driving conditions may be implemented in a controlled area, such as degraded vehicle conditions (low fuel, low air pressure, slippery road conditions, service engine soon, power steering degradation, etc. . . . ) while driving on a test track for simulated experiences, optionally leveraging AR as desired. The immersive module may be operable for utilizing sensors, indicators, etc. of the vehicle may be controlled to create a challenging driving situation for a driver, rider, and car enthusiast for a further immersive, simulated experience, such as by identifying complex situations and opportunities, e.g., one-way roads, construction, and high traffic are imminent for a driver to experience firsthand as an actual experience, and/or to identify concert or large traffic events will create congestion or complex low speed maneuvering, or convergent points (traffic shifts, multi lane to single lane) or otherwise high stress driving conditions for actual experience.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for controlling a vehicle to generate an immersive vehicle driving experience, the method comprising:

determining one or more vehicle systems configured for controlling one or more vehicle functions of the vehicle, the one or more vehicle systems including a vehicle brake system, a vehicle steering system, and/or a vehicle powertrain, and the one or more vehicle functions including a braking function, a steering function, and/or an acceleration function;

determining one or more real parameters for the one or more vehicle systems, the one or more real parameters controlling the one or more vehicle systems to perform the one or more vehicle functions associated therewith to provide a real driving experience;

determining a challenge to be implemented as part of the immersive vehicle driving experience, the challenge exposing a driver of the vehicle to circumstances selected to simulate challenging driving conditions;

generating one or more challenge parameters for the challenge, the one or more challenge parameters differing from the one or more real parameters to relatedly alter operation of the one or more vehicle systems associated therewith to correspondingly implement the challenge;

generating, using the one or more challenge parameters, vehicle system instructions for controlling the one or more vehicle systems to perform a sequence of the vehicle functions that simulate predetermined driving conditions associated with the challenge; and controlling the one or more vehicle systems based on the vehicle system instructions to execute the sequence of the vehicle functions such that the vehicle implements the challenge while the vehicle is in motion.

2. The method according to claim 1, wherein the challenge includes a roadway event causing the driver to experience a challenge condition while traversing a roadway, the challenge condition differing from a real condition of the roadway the driver would otherwise experience during the real driving experience.

3. The method according to claim 1, wherein the challenge includes a deteriorated performance event causing the driver to experience deteriorated performance for the one or more vehicle systems, the deteriorated performance differing from a real performance the driver would otherwise experience for the vehicle systems during the real driving experience.

4. The method according to claim 1, wherein the challenge includes a complex driving situation directing the driver to navigate the vehicle through a complex traffic situation while undertaking the immersive vehicle driving experience.

5. The method according to claim 4, wherein the complex traffic situation corresponds with a construction area, a lane convergence area, a traffic shift area, and/or a traffic congested area.

6. The method according to claim 4, wherein the challenge includes challenge instructions for navigating the vehicle to the complex traffic situation, the challenge instructions identifying a time, a location, a set of positioning coordinates, and/or a route to be traversed for the complex traffic situation.

7. The method according to claim 1, wherein the challenge includes an augmented reality (AR) event for the driver, the AR event resulting including one or more virtual objects being interfaced with the driver during the immersive vehicle driving experience.

8. The method according to claim 7, further comprising:

interfacing the one or more of the virtual objects with the driver such that the one or more virtual objects appear within a real environment exterior to the vehicle.

9. The method according to claim 8, wherein the selected experiences simulated by the challenge of the immersive vehicle driving experience include a flat tire, hard braking, heavy traffic, traffic shifts, event traffic, potholes, towing, a construction zone, hard rain, fog, ice, depleted battery, low wiper fluid warning, low fuel warning, service engine warning, overheat warning, camera or mirror inoperability, reduced engine or motor power, and/or hard acceleration.

10. The method according to claim 1, further comprising:

monitoring operating states for the one or more vehicle systems while the vehicle is operating according to the immersive vehicle driving experience; and implementing an override in response to one or more of the operating states exceeding a threshold, the override causing the vehicle to operate thereafter according to the real driving experience.

11. The method according to claim 10, further comprising:

activating the immersive vehicle driving experience in response to an input of the driver made to a user interface of the vehicle; and automatically implementing the override without requiring the driver to correspondingly engage the user interface.

12. The method according to claim 1, further comprising:

monitoring a performance of the driver during the immersive driving experience; and generating a performance report based on the performance, the performance report including driving and/or operating errors made by the driver during the immersive driving experience.

13. The method according to claim 12, further comprising:

monitoring biometric data of the driver during the immersive driving experience; and generating a biometrics report based on the biometric data, the biometrics report including a stress mapping of stress experienced by the driver during the immersive driving experience.

14. A system for providing an immersive vehicle driving experience, the system comprising:

a vehicle operating system configured for controlling a plurality of vehicle systems operating onboard a vehicle, the vehicle systems configured for controlling related vehicle functions of the vehicle, the vehicle systems including a vehicle brake system, a vehicle steering system, and/or a vehicle powertrain, and the vehicle functions including a braking function, a steering function, and/or an acceleration function; and an immersive module configured to:

determine a set of real parameters for controlling the vehicle systems to perform the vehicle operations associated therewith to provide a real driving experience;

determine a challenge to be implemented as part of the immersive vehicle driving experience to expose a driver of the vehicle to selected circumstances that simulate predetermined driving conditions;

generate a set of challenge parameters that alter operation of the vehicle systems to correspondingly implement the challenge, the set of challenge parameters differing from the set of real parameters;

generate, using the set of challenge parameters, vehicle system instructions for controlling the vehicle systems to perform a sequence of the vehicle functions that simulate the predetermined driving conditions for the challenge; and controlling the vehicle operating system, based on the vehicle system instructions, to implement the immersive vehicle driving experience, the immersive vehicle driving experience providing a challenge to expose a driver of the vehicle to one or more challenging driving conditions.

15. The system according to claim 14, wherein the challenge includes a roadway event causing the driver to experience a challenge condition while traversing a roadway, the challenge condition differing from a real condition of the roadway the driver would otherwise experience during a real driving experience.

16. The system according to claim 15, wherein the challenge includes a deteriorated performance event causing the driver to experience deteriorated performance for one or more of the vehicle systems, the deteriorated performance differing from a real performance the driver would otherwise experience for the vehicle systems during the real driving experience.

17. The system according to claim 16, wherein the challenge includes a complex driving situation directing the driver to navigate the vehicle to a complex traffic condition while undertaking the immersive vehicle driving experience.

18. The system according to claim 17, wherein the challenge includes an augmented reality (AR) event for the driver, the AR event resulting in one or more virtual objects being interfaced with the driver during the immersive vehicle driving experience.

19. The system according to claim 18, wherein the immersive module is further configured to:

monitor biometrics of the driver while undertaking the challenge; and provide a biometric report based on the biometrics, the biometric report including stress related responses of the driver during the challenge.

20. A motor vehicle, comprising:

a vehicle body;

a plurality of road wheels attached to the vehicle body;

a plurality of vehicle systems configured to control a plurality of vehicle functions of the motor vehicle, the vehicle systems including a vehicle brake system configured to decelerate the vehicle, a vehicle steering system configured to maneuver the motor vehicle, and a vehicle powertrain configured to propel the motor vehicle, and the vehicle functions including a braking function, a steering function, and an acceleration function; and a vehicle controller attached to the vehicle body and programmed to:

determine a set of real parameters for controlling the vehicle systems to perform the vehicle functions associated therewith to provide a real driving experience;

determine a challenge to be implemented as part of an immersive vehicle driving experience, the challenge exposing a driver of the motor vehicle to circumstances selected to simulate predefined driving conditions;

generate a set of challenge parameters to alter operation of the vehicle systems associated therewith to correspondingly implement the challenge, the challenge parameters differing from the real parameters;

generate, using the challenge parameters, system instructions for controlling the vehicle systems to perform a sequence of the vehicle functions that simulate predetermined driving conditions associated with the challenge; and control the vehicle systems based on the system instructions to execute the sequence of the vehicle functions such that the motor vehicle implements the challenge while the motor vehicle is in motion.

* * * * *